May 9, 1950 K. A. RAYPHOLTZ 2,506,738
PREDETERMINED VALVE CONTROL SYSTEM
Filed Feb. 23, 1946 2 Sheets-Sheet 1

INVENTOR.
KENNETH A. RAYPHOLTZ.
BY
Lockwood, Goldsmith & Galt,
ATTORNEYS.

May 9, 1950 K. A. RAYPHOLTZ 2,506,738
PREDETERMINED VALVE CONTROL SYSTEM
Filed Feb. 23, 1946 2 Sheets-Sheet 2

INVENTOR.
KENNETH A. RAYPHOLTZ
BY
Lockwood, Goldsmith & Galt.
ATTORNEYS.

Patented May 9, 1950

2,506,738

UNITED STATES PATENT OFFICE 2,506,738

PREDETERMINED VALVE CONTROL SYSTEM

Kenneth A. Raypholtz, Marion, Ind., assignor to Overmander Machine, Inc., Marion, Ind., a corporation Application February 23, 1946, Serial No. 649,515

7 Claims. (Cl. 103—35)

This invention relates to a predetermined valve control system.

In the formation of predetermined bituminous mixtures as for highways and the like continuous mixing is the most economical in all respects providing the aggregate supply, after proportion adjustment is attained, is uniform, and providing the bituminous material is correspondingly supplied.

However, uniform aggregate supply based upon weight control is inaccurate. Rate of flow, however, is sufficiently accurate and such is disclosed and claimed in the copending application Serial No. 655,764, filed March 2, 1946, and entitled Continuous volumetric control apparatus.

For continuous production of a predetermined bituminous mixture wherein the aggregate is continuously supplied at a predetermined rate of flow, only a predetermined amount of asphalt (liquid) need be supplied, and the same mixed for the required interval.

Such supply of asphalt by a rated pump can be varied as desired or required by varying the speed of said pump. However, the speed of the pump may and usually will vary inversely as the load imposed thereon. Thus the asphalt supply may vary generally as the temperature thereof, for example.

Accordingly the chief object of the present invention, when incorporated in a bituminous mixture apparatus, such as illustrated in Fig. 1 of the aforesaid application, by way of example only, is to provide a manually and automatically operable adjustment for an asphalt pump whereby any predetermined flow of asphalt is attained.

The chief feature of the present invention resides in the manually adjustable automatic control for one asphalt pump.

Other objects and features of the invention will be set forth more fully hereinafter.

The full nature of the invention will be understood from the accompanying drawings and the following description and claims.

Figure 1:
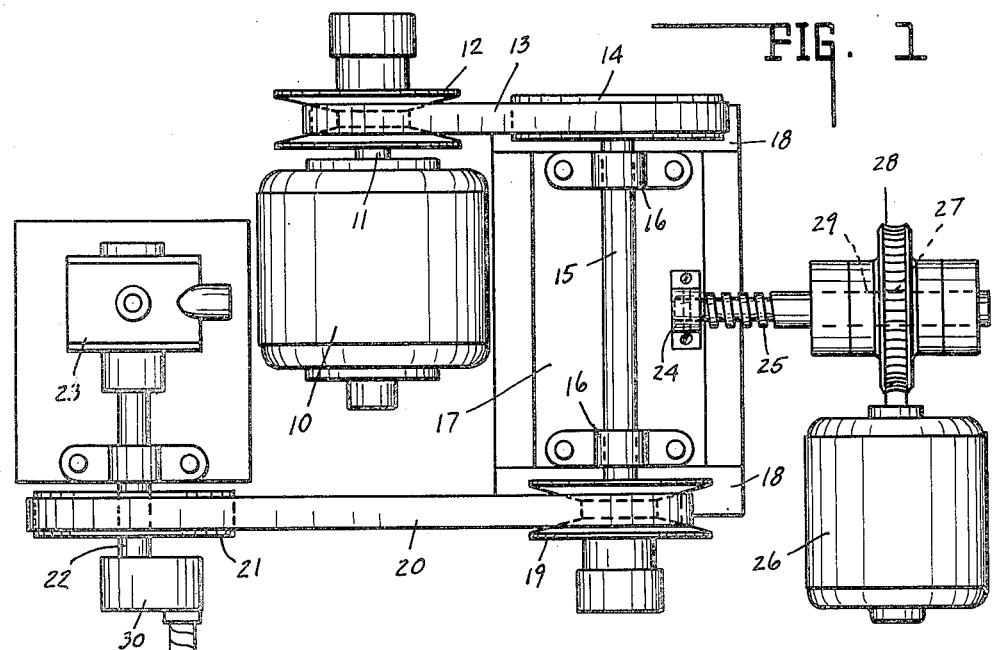
Fig. 1 is a diagrammatic plan view of a pump unit with controls, the speed governor being shown partly in central section.
Figure 1:
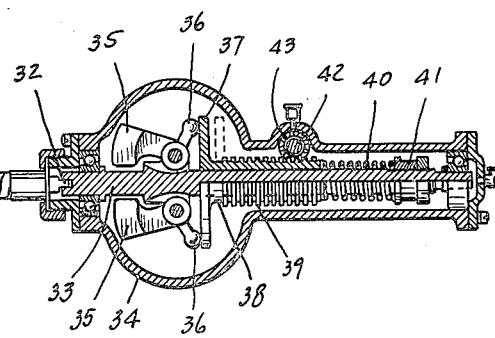

In Fig. 1 10 indicates a power motor having shaft 11 upon which is mounted spring loaded V-pulley 12, driving belt 13, driving pulley 14 on the jack shaft 15 mounted in bearings 16 on carriage 17 slidable in ways 18.

Shaft 15 mounts a similar spring loaded V-pulley 19 driving belt 20 in turn driving pulley 21 on shaft 22 of the pump unit having the pump 23 for asphalt (liquid) pumpage.

Motor 10 is a constant speed motor. Carriage 17 has secured to it anchorage 24 in which is mounted a threaded shaft 25. An adjusting motor 26 has a worm 27 on its shaft and said worm meshes with worm wheel 28. Wheel 28 is internally threaded as at 29 and confined against axial movement. Accordingly when the control motor is energized for rotation in one direction the carriage is moved to the right and when reversely energized the carriage is moved in the opposite direction. Since the two belts are substantially of fixed lengths, the springs of the pulleys yield or take up the play as well understood with respect to these devices. Accordingly carriage position determines the pump speed under load.

Since, however, the load may vary due to viscosity of the asphalt pumped, and thus the volume vary, there is provided a gear reduction drive take off 30 from the pump shaft. Flexible drive shaft 31 therefrom has a detachable and spline connection 32 to a speed shaft 33 of a centrifugal governor 34 having weights 35 with noses 36 bearable upon plate 37 carried by sleeve 38, the latter having annular parallel teeth thereon, or an annular rack 39. This rack is spring loaded as at 40 and the force thereof is adjustable at 41.

Meshing with the annular rack 39 is the pinion 42 having shaft 43 keyed or otherwise secured to an insulation (phenolic) drum 44. This is associated with the control for the speed control motor which is of reversible type. Thus as the speed of the pump varies from any predetermined value same is reflected in the speed governor and the annular rack is moved to right upon pump speed increase and to the left upon pump speed decrease. Thus drum 44 rotates counterclockwise for an increase of pump speed and clockwise for a decrease in pump speed. This action thereupon is translated to the control motor 26 to move the carriage to effect slow down and speed up of the pump respectively to hold the pump speed to the selected predetermined value for the constant motor speed and load variation due to viscosity and like effects well known.

Figure 5:
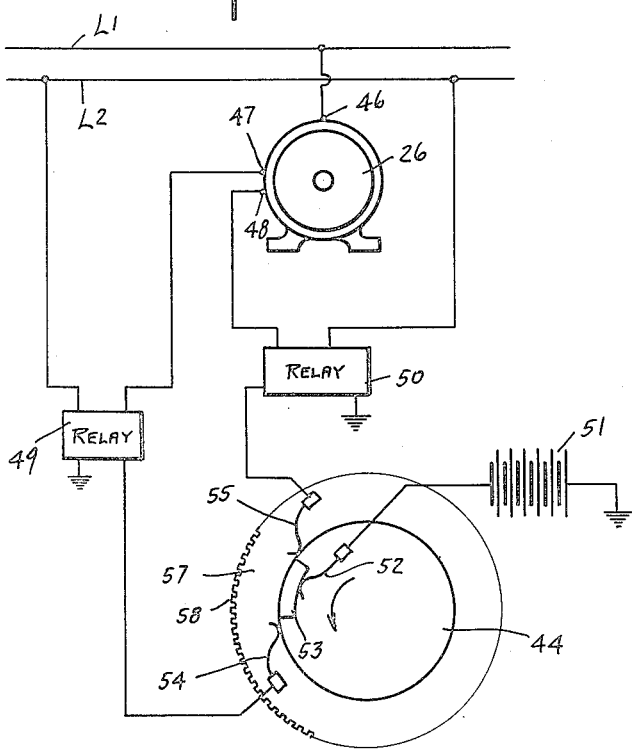
Fig. 5 is a schematic wiring diagram of the speed control motor circuits and included drum switch.

Reference will now be had to the wiring diagram, see Fig. 5. Herein 26 and 44 designate the control motor and the drum. Same are independent of each other except for electrical connections. These include power supply lines L1 and L2. The main switch for same is omitted since it is not essential to an understanding of the present invention.

Motor 26 being of reversible type is provided with three terminals 46—47—48. Line L—1 is connected directly to terminal 46. Line L—2 is connected through relay unit 49 to terminal 47. Line L—2 is connected through relay unit 50 to terminal 48.

Each relay unit includes a pair of contacts one connected to the line and the other to the motor terminal. A bridging contact for closing the circuit is carried by a core of a relay. When the relay is energized the bridging contact closes the relay unit switch. When the relay is deenergized the bridging contact drops to open circuit position.

Herein a low voltage supply 51 is connected to brush 52 in the path of arcuate contact 53 carried by drum 44. Contact or finger 54 has predetermined spacing from a similar contact 55. Each bears upon the drum periphery. When contact 53 engages finger 54 relay 49 is energized and motor 26 is energized for correct rotation in the corrective direction. When contact 53 engages finger 55 relay 50 is energized and motor 26 is reversely energized.

The duration of energization of motor 26 is determined by the duration of contact between the drum contact and the finger (54 or 55) and the speed change is automatically changed until the predetermined volume is being pumped and this is held substantially constant for asphalt variation.

Figure 2:
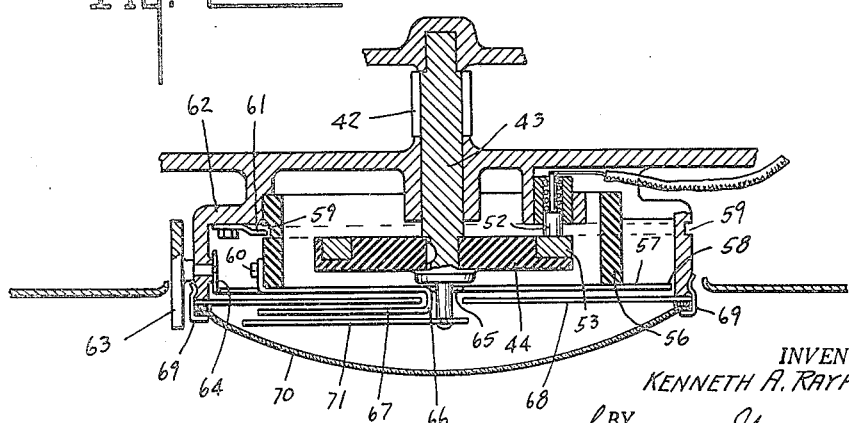
Fig. 2 is a transverse central sectional view of the switch control and volume indicator.
Figure 3:
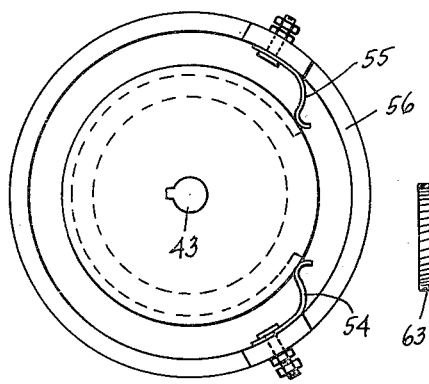
Fig. 3 is an elevational view of the switch control drum.
Figure 4:
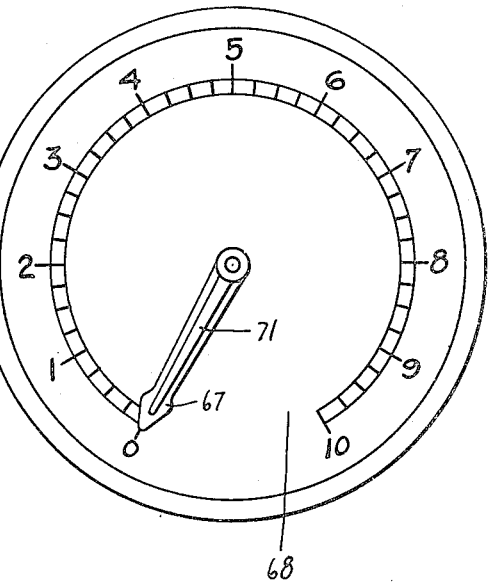
Fig. 4 is an elevational view of the dial face, etc.

When it is desired to change the volume to be pumped a manual adjustment is provided. The drum 44, see Fig. 2, oscillates within insulation ring 56 carrying contacts 54 and 55. The face of the ring mounts as at 60 a plate 57 having a peripheral series of teeth 58. Ring 56 has a peripheral groove 59 which takes a plurality of arcuately spaced retainers 61 carried by casing 62 whereby ring 56 is supported by casing 62, see Fig. 2. A knob 63 carries internally of the casing a gear or toothed wheel 64 which meshes with teeth 58 on plate 57.

By this means the neutral position between contacts 54 and 55 can be shifted clockwise or counterwise as required for any selected predetermined speed of the pump. Plate 57 is centrally apertured at 65 and a portion 66 is turned outwardly and mounts an indicating finger 67.

A legended, centrally apertured plate 68 is retained by bezel 69 together with cover plate 70. Shaft 43 is extended through the aperture 65 in gear plate 57 and the aperture in plate 68 but terminates short of the lens or cover plate 70. The exposed shaft end mounts another pointer or finger 71.

Knob 63 adjusts pointer 67 to the desired G. P. M. indication. This is the calculated rate of flow desired. The other manual adjustments are made so that pointer 71 registers with pointer 67. As the rate of flow varies the needle 71 floats back and forth as pump flow varies and as such variation occurs the speed control not only selectively energizes motor 26 for pump speed change but adjusts pointer 71 as well.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In a control system having a pump, a constant speed motor for driving same and a variable speed drive mechanism therebetween, the combination of reversible power means connected to the drive mechanism for reversibly adjusting the latter for speed variation, means operatively connected to the drive mechanism and operable at a speed proportional to pump speed, and a reversible control operatively connected to the power means for control thereof and operable by the pump speed responsive means.

2. In a control system having a pump, a constant speed motor, and a variable drive mechanism comprising dual V-belts, at least two spring loaded pulleys, one associated with each belt, a jack shaft operatively interposed between belts, and a movable carriage for said shaft, the combination of a self locking reversible means for moving the carriage, a reversible motor for reversely actuating said means, a pump speed responsive centrifugal device, and switch means for the reversible motor and operable by the centrifugal device for variable drive mechanism control for constant pumpage purposes.

3. In a control system having a pump, a constant speed motor, and a variable drive mechanism comprising dual V-belts, at least two spring loaded pulleys, one associated with each belt, a jack shaft operatively interposed between belts, and a movable carriage for said shaft, the combination of a self locking reversible means for moving the carriage, a reversible motor for reversely actuating said means, a pump speed responsive centrifugal device, and switch means for the reversible motor and operable by the centrifugal device for variable drive mechanism control for constant pumpage purposes, the self locking reversible means comprising a screw threaded member carried by the carriage and axially movable therewith, a nut on the threaded member and having a worm wheel periphery, and a worm meshing therewith and reversible motor driven.

4. In a control system having a pump, a constant speed motor, and a variable drive mechanism comprising dual V-belts, at least two spring loaded pulleys, one associated with each belt, a jack shaft operatively interposed between belts, and a movable carriage for said shaft, the combination of a self locking reversible means for moving the carriage, a reversible motor for reversely actuating said means, a pump speed responsive centrifugal device, and switch means for the reversible motor and operable by the centrifugal device for variable drive mechanism control for constant pumpage purposes, the centrifugal device comprising a spring loaded cylindrical rack and a pinion meshing therewith, and the switch means comprising a multiple contact drum rotatable by the pinion.

5. In a control system having a pump, a constant speed motor, and a variable drive mechanism comprising dual V-belts, at least two spring loaded pulleys, one associated with each belt, a jack shaft operatively interposed between belts, and a movable carriage for said shaft, the combination of a self locking reversible means for moving the carriage, a reversible motor for reversely actuating said means, a pump speed responsive centrifugal device, and switch means for the reversible motor and operable by the centrifugal device for variable drive mechanism control for constant pumpage purposes, the switch means comprising a reversely rotatable contact drum, a rotatable contact support coaxial therewith, and manual means for arcuately shifting the position of the support for pump speed predetermined adjustment.

6. In a control system having a pump, a constant speed motor, and a variable drive mechanism comprising dual V-belts, at least two spring loaded pulleys, one associated with each belt, a jack shaft operatively interposed between belts, and a movable carriage for said shaft, the combination of a self locking reversible means for moving the carriage, a reversible motor for reversely actuating said means, a pump speed responsive centrifugal device, and switch means for the reversible motor and operable by the centrifugal device for variable drive mechanism control for constant pumpage purposes, dual indicators, and means for manually adjusting said switch means, one of the indicators having operative connection with the manually adjustable means and the other of said indicators having operative connection to the centrifugal device and responsive to the operation thereof.

7. In a control system having a pump, a constant speed motor, and a speed varying drive mechanism connected to the motor and the pump for variably driving said pump by the constant speed motor, the combination of a reversible electric motor of three wire type for varying the speed output of the speed mechanism, and pump fluid viscosity variable condition responsive means comprising at least a pair of remote controlled switches for two of the wires, each remote control switch having another switch for controlling the remote control switch, and circuit means selectively associated with the pair of said other switches for reversible motor control.

KENNETH A. RAYPHOLTZ.

REFERENCES CITED

The following references are of record in the file of this patent:

UNITED STATES PATENTS

| Number | Name | Date |
| --- | --- | --- |
| 1,749,569 | De Florez | Mar. 4, 1930 |
| 1,834,333 | Church | Dec. 1, 1931 |
| 1,961,350 | Grunsky | June 5, 1934 |